United States Patent
Quero et al.

(10) Patent No.: US 12,429,331 B2
(45) Date of Patent: Sep. 30, 2025

(54) FEATURE DETERMINATION AND CALIBRATION OF PIPELINE GEOMETRY AND FEATURES UTILIZING CONTROLLED FLUID WAVES

(71) Applicant: Halliburton Energy Services, Inc., Houston, TX (US)

(72) Inventors: Philippe Quero, Houston, TX (US); Jeremy C. Nicholson, Houston, TX (US); Oluwatosin Ogundare, Houston, TX (US); David Bennett, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 298 days.

(21) Appl. No.: 18/128,338

(22) Filed: Mar. 30, 2023

(65) Prior Publication Data
US 2024/0328780 A1    Oct. 3, 2024

(51) Int. Cl.
*G01B 13/00* (2006.01)
*G01B 13/16* (2006.01)

(52) U.S. Cl.
CPC .............. *G01B 13/00* (2013.01); *G01B 13/16* (2013.01)

(58) Field of Classification Search
CPC .......... G01L 23/00; G01B 13/16; G01B 13/00
See application file for complete search history.

(56) References Cited

U.S. PATENT DOCUMENTS

| | | | |
|---|---|---|---|
| 11,208,883 B2 | 12/2021 | Jagannathan et al. | |
| 11,435,256 B2 | 9/2022 | Jagannathan | |
| 11,448,582 B2 | 9/2022 | Bennett et al. | |
| 11,455,445 B2 | 9/2022 | Jagannathan et al. | |
| 11,519,807 B2 | 12/2022 | Ogundare et al. | |
| 2002/0088281 A1 | 7/2002 | Gorman et al. | |
| 2005/0120799 A1 | 6/2005 | Gysling et al. | |
| 2011/0267922 A1* | 11/2011 | Shampine | E21B 47/107 367/25 |
| 2020/0040808 A1 | 2/2020 | Jia | |
| 2020/0173880 A1 | 6/2020 | Bennett et al. | |
| 2020/0182831 A1* | 6/2020 | Jha | G01N 29/4481 |
| 2020/0408086 A1* | 12/2020 | Jagannathan | E21B 47/006 |

FOREIGN PATENT DOCUMENTS

| | | |
|---|---|---|
| CN | 103800017 B | 4/2016 |
| KR | 1020000044996 | 7/2000 |
| WO | 2022060392 A1 | 3/2022 |

OTHER PUBLICATIONS

International Search Report and Written Opinion for International Patent Application No. PCT /US2023/020114 dated Dec. 8, 2023. PDF file. 9 pages.

* cited by examiner

*Primary Examiner* — Paul M. West

(74) *Attorney, Agent, or Firm* — Thomas Rooney; C. Tumey Law Group PLLC

(57) ABSTRACT

Systems and methods of the present disclosure relate to identifying geometric features of a conduit. A method includes controlling a flow into or out of a conduit to induce pressure waves in the conduit; measuring, with a pressure transducer, pressure responses in the conduit due to contact of the pressure waves with a geometric feature of the conduit; and identifying the geometric feature, based on the pressure responses.

20 Claims, 4 Drawing Sheets

FEATURE DETERMINATION AND CALIBRATION OF PIPELINE GEOMETRY AND FEATURES UTILIZING CONTROLLED FLUID WAVES

BACKGROUND

Currently, diagnostics for long distance pipelines do not account for significant changes in geometry such as tees and wyes. The diagnostics do not allow for accurate distance calibration for the significant changes in geometry. Additionally, the diagnostics do not allow for distinguishing pipeline features such as bends and elbows from deposition features. Pipelines may experience issues such as a build-up of deposits or full blockages due to these build-ups.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for identifying geometric features of conduits such as pipelines or wellbores, for example. The geometric features used herein are defined as pipeline deviations (e.g., bends) such as sections that include changes in a direction of the conduit such as tees, wyes, and/or curves. The systems and methods of the present disclosure may allow for identification of the geometric features.

The identification of the geometric features of a conduit may occur in real-time via an analysis of an induced pressure wave (e.g., transient waves) and its corresponding response that may travel along the conduit back to the origin or source of the pressure wave inducement. The identification may be performed by creating or inducing a pressure wave in the conduit and analyzing a pressure response to determine a geometric feature.

At least two pressure waves may be induced to elicit or cause at least two corresponding pressure responses that may reflect off of a geometric feature, and travel as pressure responses back to the source of the pressure wave inducement for analysis. An interaction due to contact between the induced pressure waves and the geometric feature may result in the pressure responses. The analysis may be automated and repeated to locate the geometric feature.

Multiple transient pressure waves include magnitudes that are varied. The variations are utilized to distinguish geometric features of the pipeline from depositions or leaks. Identification of differentiation of geometric features in pipelines and wellbores are utilized to characterize systems by inducing two or more transient waves into a pipeline and evaluating returning signals. For example, transient wave is compared to transient wave 2 in regard to signal generation length. A statistical process control or machine learning methodology may be used to evaluate the differences in the transient waves. The resulting differences are compared/contrasted to establish an upper and lower bound of confidence regarding the signal differential to characterize the signal differential as either a geometric feature (e.g., geometric feature in pipeline) or a deposition or leak. If a geometric feature is identified, the geometric feature is then evaluated based on known behaviors for tees, wyes, and curves.

In some examples, a system controller and a pressure measurement device may be operatively coupled to existing infrastructure such as a pipeline. A device for inducing the pressure waves by controlling flow of a fluid, may be a component of the existing infrastructure, such as a valve, a pump, and/or a supply vessel, for example. Each of the components may be positioned to control a flow of fluid within a conduit to induce pressure waves.

Figure 1A:
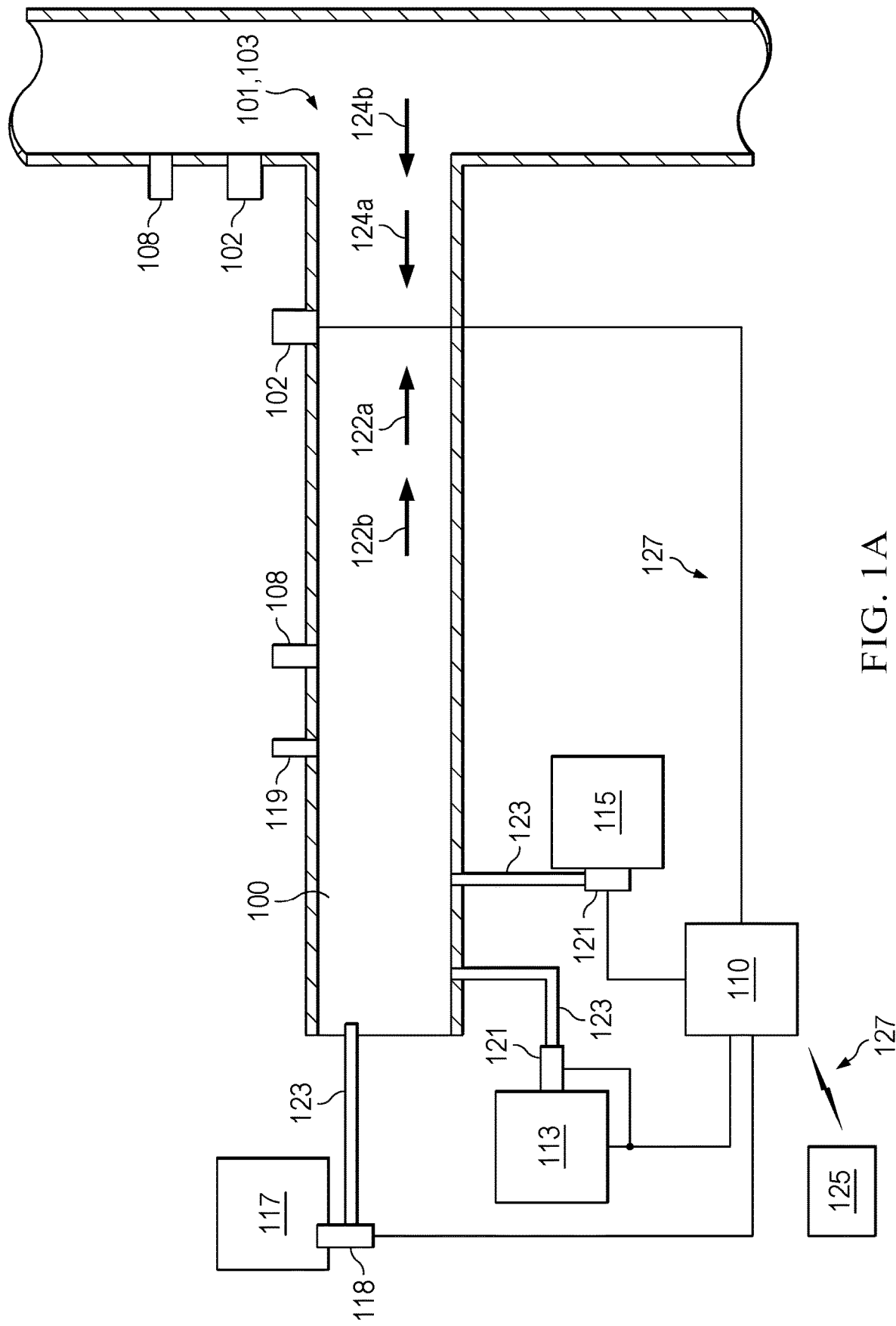
FIG. 1A illustrates a conduit with a tee configuration, in accordance with examples of the present disclosure.
Figure 1B:
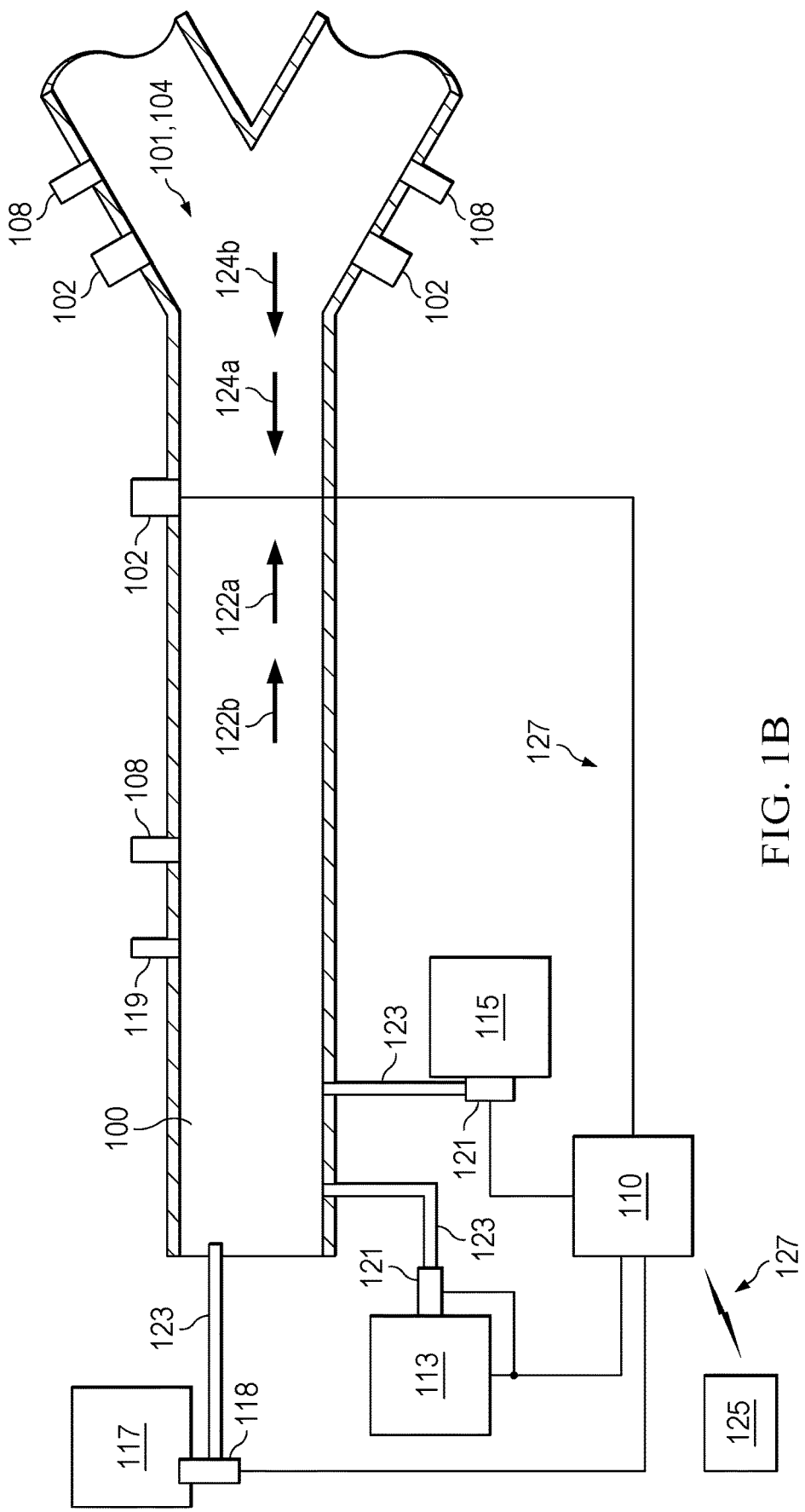
FIG. 1B illustrates a conduit with a wye configuration, in accordance with examples of the present disclosure.
Figure 1C:
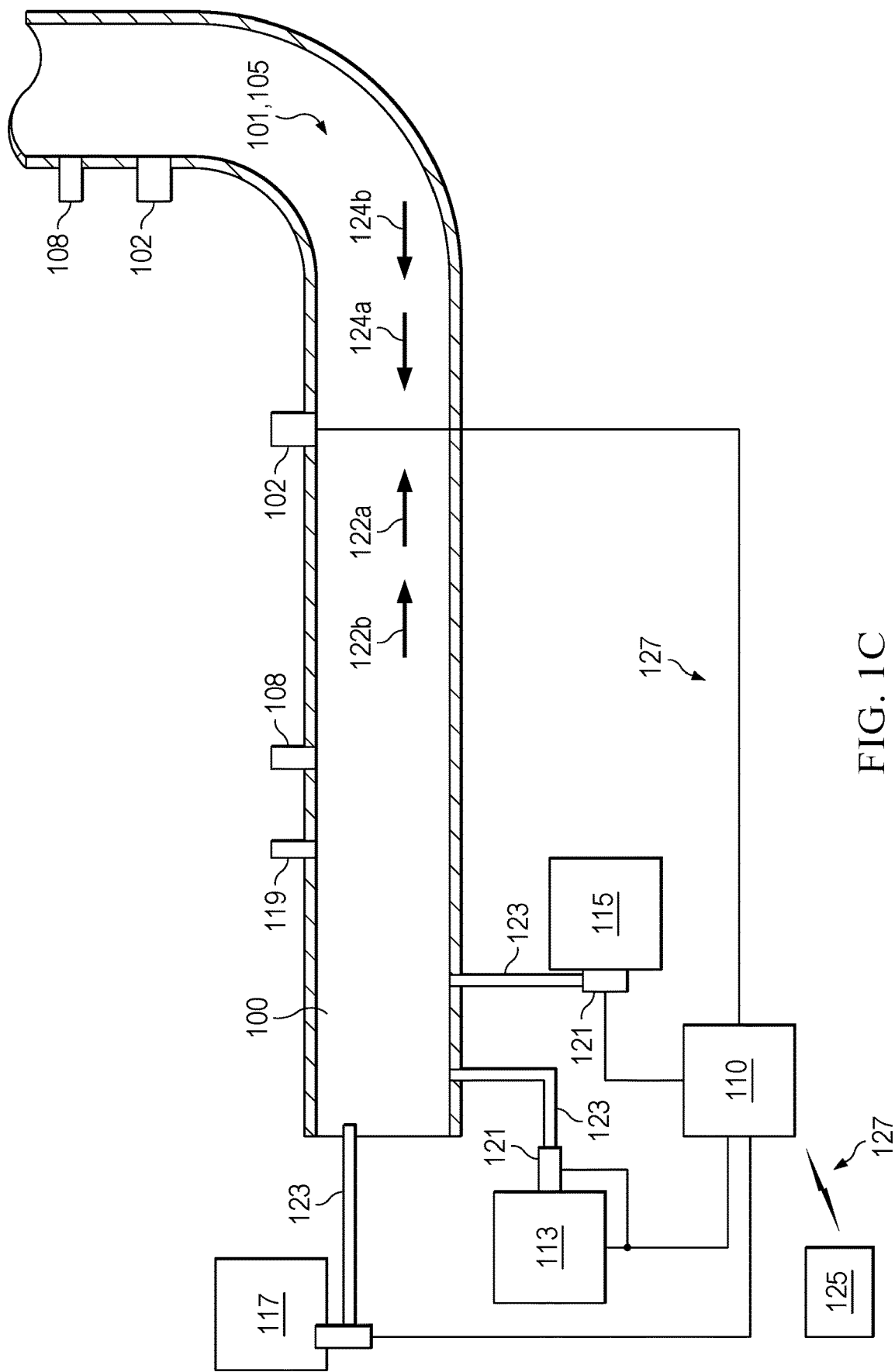
FIG. 1C illustrates a conduit with a curved configuration, in accordance with examples of the present disclosure.

FIGS. 1A-1C illustrates a conduit 100 with a geometric feature 101, in accordance with examples of the present disclosure. FIG. 1A illustrates a geometric feature that includes a tee 103. FIG. 1B illustrates a geometric feature that includes a wye 104. FIG. 1C illustrates a geometric feature that includes a curve 105. The conduit 100 may represent a pipeline or a wellbore, in certain examples. The pressure transducers 102 may be in fluid communication with contents of the conduit 100 to indicate an internal pressure(s) of the conduit 100. The pressure transducers may sample data.

The conduit 100 may also include a passage (e.g., valves 108 to control flow such as an ingress or egress of fluid. Rapid opening and closing of one of the valves 108 may induce pressure waves within the conduit 100. The valve may open and close within seconds. In some examples, 5 seconds may be the maximum open time. In other examples, the valve may remain open for 1 second or less before it is closed. In some examples, the pressure transducers 102 and the valves 108 may be disposed downstream and/or upstream to the geometric feature 101. In particular examples, more pressure transducers and valves may be utilized in both the upstream and/or downstream directions.

The pressure waves may include positive and/or negative pressure waves which may be induced by manipulation of one of the valves 108, for example. In certain examples, a negative pressure wave may be induced within the conduit 100. In addition to the valves 108, a number of suitable techniques may be used for inducing the pressure waves. For example, reciprocating pump 113 may remove fluid from the conduit 100 to induce a negative pressure wave. By way of further example, fluid may be released from the conduit 100 into an expansion vessel 115. In some examples, a valve 119 may be used to bleed of fluid from the conduit 100.

In addition to or in combination with the negative pressure, a positive pressure wave may also be induced in the conduit 100. In some examples, the valves 108 may be utilized to induce the positive pressure wave. In additional examples, a supply tank or a supply vessel 117 may supply fluid into the conduit 100 to induce the positive pressure wave in the conduit 100. In some examples, the supply vessel 117 may utilize a pump 118 to move fluid into the conduit 100. The supply vessel 117 may provide any suitable fluids into the conduit 100. Non-limiting examples may include gas such as nitrogen into a gas system, or water (or other suitable liquid) into a liquid system. By way of further example, fluid such as nitrogen may be flowed into the conduit 100 via the supply vessel 117.

The reciprocating pump 113 and the vessels 115 and 117 may be in fluid communication with the conduit 100 via valves 121 and/or conduits 123. It should be noted that mechanisms to induce pressure waves such as those described herein, for example, may be disposed at various locations along the conduit 100. The locations may be upstream and/or downstream to the geometric feature 101. The pressure waves may be induced at regular intervals, or the intervals may be variable. In some examples, there may be multiple geometric features at multiple locations in the conduit 100. In some examples, the inducement of the pressure waves may occur manually. In other examples, the inducement of pressure waves may be automated via a system controller.

In some examples, a system controller 110 may control fluid flow into and out from the conduit 100. For example, the system controller 110 may be operable to control the valves 108a and 108b, the pumps 113 and 118, and/or the valves 121 to induce the pressure waves (e.g., transient pressure waves 122a and 122b) that may travel through the conduit 100 eliciting a pressure response. The pressure response includes a reflected pressure waves (e.g., transient pressure waves 124a and 124b) that has been reflected off the geometric feature 101 back to the source of the pressure wave inducement. The reflected pressure wave or response may be measured by the pressure transducer 102 and recorded by the system controller 110 for analysis, such as identifying the geometric feature 101 in the conduit 100. Upon manipulating a component (e.g., a valve, pump, and/or vessel) of a hydraulic system, a fluid flow may temporarily be stopped or restricted to induce a pressure wave in the conduit 100, and a pressure in the conduit 100 may be continuously recorded. The multiple transient pressure waves include magnitudes that are varied. The variations are utilized to distinguish geometric features of the pipeline from depositions or leaks. Identification of differentiation of geometric features in pipelines and wellbores are utilized to characterize systems by inducing two or more transient waves into a pipeline and evaluating returning signals. For example, transient wave is compared to transient wave 2 in regard to signal generation length. A statistical process control or machine learning methodology may be used to evaluate the differences in the transient waves. The resulting differences are compared/contrasted to establish an upper and lower bound of confidence regarding the signal differential to characterize the signal differential as either a geometric feature (e.g., geometric feature in pipeline) or a deposition or leak. If a geometric feature is identified, the geometric feature is then evaluated based on known behaviors for tees and wyes.

The system controller 110 may include a display, a storage unit, and/or any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the system controller 110 may be a computer, a network storage device, or any other suitable device and may vary in size, shape, performance, functionality, and price. The system controller 110 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The system controller 110 may also include input device (s) (e.g., keyboard, mouse, touchpad, etc.) and output device (s) (e.g., monitor, printer, etc.). The input device(s) and output device(s) provide a user interface. For example, the system controller 110 may enable an operator to select and perform analysis, view collected data, view analysis results, and/or perform other tasks. The system controller 110 may be in communication (e.g., wire or wireless) with various components via communication paths 127. In some examples, the system controller 110 may be operated remotely (e.g., wirelessly) via a device 125 which may include a personal computer, tablet, smartphone, or other digital device. The system controller 110 may be in communication (e.g., wire or wireless) with various components via communication paths 127. In some examples, the system controller 110 may be battery-powered (e.g., rechargeable lithium-ion battery) with up to 10 hours of operation time and may include piezoelectric switches. In other examples, the system controller 110 may be powered by an electric grid and/or a portable generator.

Figure 2:
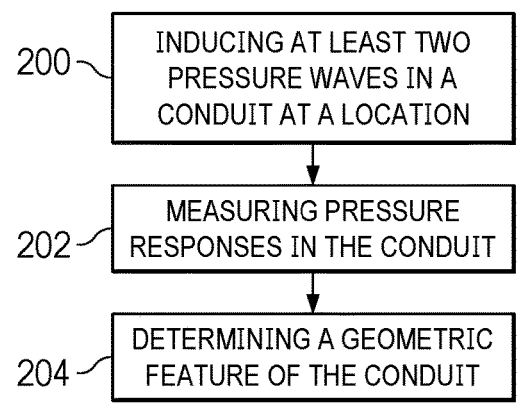
FIG. 2 illustrates a flow chart for identifying geometric features of conduits, in accordance with examples of the present disclosure.

FIG. 2 illustrates a flow chart for identifying geometric features of pipelines and/or wellbores, in accordance with examples of the present disclosure. At step 200, at least two pressure waves may be induced within a conduit. As previously described, the pressure waves may be induced within the conduit by controlling flow into or out of the conduit. The pressure waves may have similar or different properties such as frequencies and/or amplitudes, in some examples. The pressure waves may travel along a bore of the conduit to a geometric feature and reflect back to where the waves were induced (e.g., the source of the pressure wave inducement). The reflected pressure waves may be considered pressure responses in the conduit.

At step 202, the pressure responses in the conduit may be measured. In some examples, the pressure waves may be induced before either pressure response is measured. In other examples, a first response may be measured before a second response is measured. The measured pressure response (e.g., response waves) may be measured by a data recorder (e.g., the system controller). At step 204, a geometric feature is determined. The multiple transient pressure waves include magnitudes that are varied. The variations are utilized to distinguish geometric features of the pipeline from depositions or leaks. Statistical analysis of the interference of the waves may be used to identify the typical wave responses of discrete observed features (e.g., tee, wye, curve, deposition, leak) allowing for a classification of the actual observed wave responses in an applied activity. In some examples, data is processed by executing software or instructions that apply algorithms to the data for signal filtering, and sensor physics techniques on the derivatives of the recorded wave responses.

Recorded data from wave generation in conduits with known physical features (e.g., tee, wye, curve, deposition, leak) including known locations and physical properties may be used to train a machine learning model for proper identification of wave interference behaviors under the various physical feature configurations and permutations. Feature identification models from the machine learning may be combined with a statistical process control to create a confidence model (including upper and lower bounds) that is a function of the conduit configuration, feature distance, signal magnitude, wave amplitude, and transference medium.

For example, a first transient wave is compared to a second transient wave in regard to signal generation length. A statistical process control or machine learning methodology may be used to evaluate the differences in the transient waves. The resulting differences are compared/contrasted to establish an upper and lower bound of confidence regarding the signal differential to characterize the signal differential as either a geometric feature or a deposition or leak. If a geometric feature is identified, the geometric feature is then evaluated based on known behaviors, such as for the tees and wyes, for example.

Figure 3:
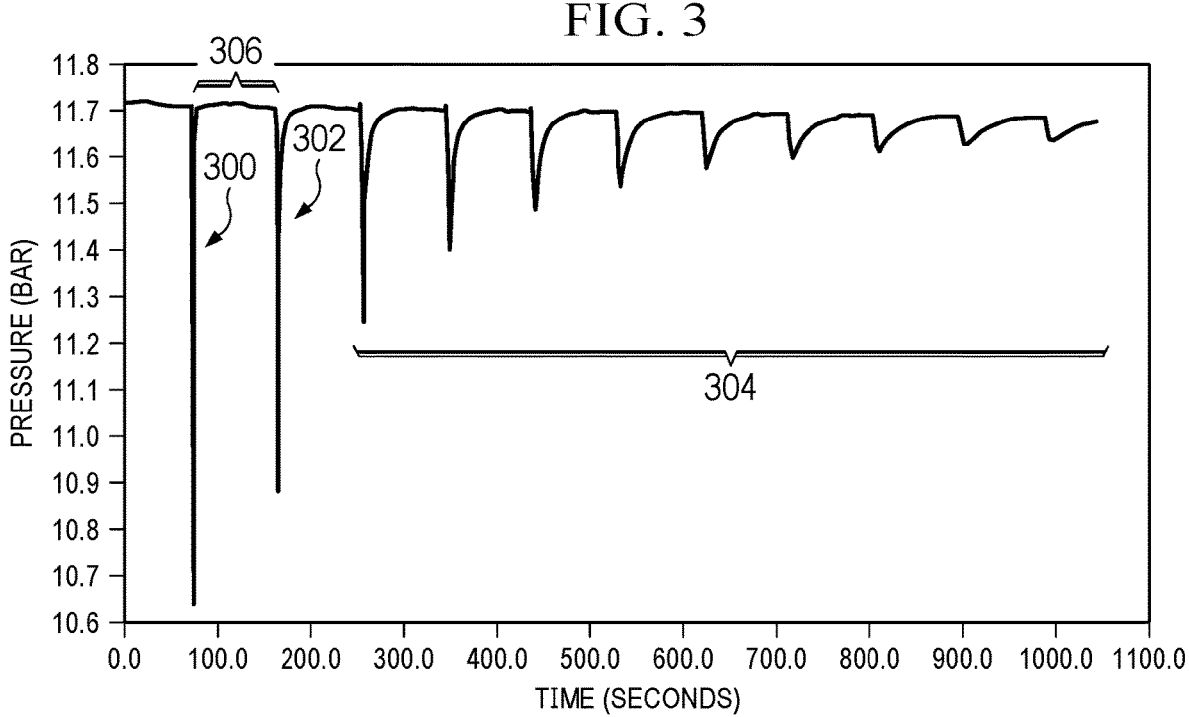
FIG. 3 illustrates a pressure response during identification of geometric features of a conduit, in accordance with examples of the present disclosure.

FIG. 3 illustrates pressure responses during geometric feature identification, in accordance with examples of the present disclosure. A pressure wave 300 may be induced to contact the geometric feature and elicit a pressure response 302 (e.g., a reflection of the pressure wave 300) and corresponding residual data 304 such as residual pressure waves, for example. The residual data 304 may not be relied upon to track the bend. A signal length 306 is also shown. As noted above, statistical analysis of the interference of the waves may be used to identify the typical wave responses of discrete observed features (e.g., tee, wye, curve, deposition, leak) allowing for a classification of the actual observed wave responses (e.g., pressure response 302) in an applied activity. A distance to the geometric feature may be calculated as a function of the mass flow rate for the medium carrying the signal. If the mass flow rate is not known, it can be derived or approximated from the measured response time to the location of a known feature in the conduit and other known physical properties of the conduit and medium.

Accordingly, the systems and methods of the present disclosure may allow for identification of geometric features in conduits such as pipelines and/or wellbores. The systems and methods may include any of the various features disclosed herein, including one or more of the following statements.

Statement 1. A method comprising: controlling a flow into or out of a conduit to induce pressure waves in the conduit; measuring, with a pressure transducer, pressure responses in the conduit due to contact of the pressure waves with a geometric feature of the conduit; and identifying the geometric feature, based on the pressure responses.

Statement 2. The method of the statement 1, wherein measuring the pressure responses in the conduit includes measuring pressure responses induced by a reciprocating pump that removes fluid from the conduit to induce at least two negative pressure waves in the conduit.

Statement 3. The method of the statement 1 or the statement 2, further comprising inducing at least two negative pressure waves in the conduit via a release of fluid from the conduit.

Statement 4. The method of any one of the preceding statements, further comprising inducing at least two positive pressure waves in the conduit via an addition of fluid into the conduit.

Statement 5. The method of any one of the preceding statements, wherein the geometric feature includes a bend.

Statement 6. The method of any one of the preceding statements, wherein the bend is a portion of a tee.

Statement 7. The method of any one of the preceding statements, wherein the bend is a portion of a wye.

Statement 8. The method of any one of the preceding statements, wherein the bend includes a curve.

Statement 9. The method of any one of the preceding statements, wherein identifying the geometric feature includes statistically analyzing the pressure responses to identify the geometric feature.

Statement 10. The method of any one of the preceding statements, wherein identifying the geometric feature includes analyzing, with machine learning, the pressure responses to identify the geometric feature.

Statement 11. A method comprising: controlling a flow into or out of a conduit that includes a bend to induce pressure waves in the conduit; measuring pressure responses in the conduit due to contact of the pressure waves with the bend; and identifying a shape of the bend, based on the pressure responses.

Statement 12. The method of the statement 11, further comprising determining that the bend includes a tee.

Statement 13. The method of the statement 11 or the statement 12, further comprising determining that the bend includes a tee.

Statement 14. The method of any one of the statements 11-13, further comprising determining that the bend includes a wye.

Statement 15. The method of any one of the statements 11-14, further comprising determining that the bend includes a curve.

Statement 16. The method of any one of the statements 11-15, wherein identifying the geometric feature includes analyzing, with machine learning, the pressure responses to identify the shape of the bend.

Statement 17. The method of any one of the statements 11-16, wherein identifying the geometric feature includes statistically analyzing the pressure responses to identify the shape of the bend.

Statement 18. The method of any one of the statements 11-17, further comprising inducing at least two positive pressure waves in the conduit.

Statement 19. The method of any one of the statements 11-18, further comprising inducing at least two negative pressure waves in the conduit.

Statement 20. The method of any one of the statements 11-19, wherein measuring the pressure responses in the conduit includes measuring pressure responses induced by a pump or a valve.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a"

or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   controlling a flow into or out of a conduit to induce at least two positive pressure waves of at least two negative pressure waves in the conduit using a pump or pressure wave inducement source;
   measuring, with a pressure transducer, pressure responses in the conduit due to contact of the at least two positive pressure waves or at least two negative pressure waves with a geometric feature of the conduit; and
   identifying the geometric feature, based on differences in the pressure responses from the at least two positive pressure waves or at least two negative pressure waves.

2. The method of claim 1, wherein measuring the pressure responses in the conduit includes measuring pressure responses induced by a reciprocating pump that removes fluid from the conduit to induce at least two negative pressure waves in the conduit.

3. The method of claim 1, father comprising inducing at least two negative pressure waves in the conduit via a release of fluid from the conduit.

4. The method of claim 1, further comprising inducing at least two positive pressure waves in the conduit via an addition of fluid into the conduit.

5. The method of claim 1, wherein the geometric feature includes a bend.

6. The method of claim 5, wherein the bend is a portion of a tee.

7. The method of claim 5, wherein the bend is a portion of a wye.

8. The method of claim 5, wherein the bend includes a curve.

9. The method of claim 1, wherein identifying the geometric feature includes statistically analyzing the pressure responses to identify the geometric feature.

10. The method of claim 1, wherein identifying the geometric feature includes analyzing, with machine learning, the pressure responses to identify the geometric feature.

11. A method comprising:
    controlling a flow into or out of a conduit that includes a bend to induce pressure waves in the conduit;
    measuring pressure responses in the conduit due to contact of the pressure waves with the bend; and
    identifying a shape of the bend, based on the pressure responses.

12. The method of claim 11, further comprising determining that the bend includes a tee.

13. The method of claim 11, further comprising determining that the bend includes a tee.

14. The method of claim 11, further comprising determining that the bend includes a wye.

15. The method of claim 11, further comprising determining that the bend includes a curve.

16. The method of claim 11, wherein identifying the geometric feature includes analyzing, with machine learning, the pressure responses to identify the shape of the bend.

17. The method of claim 11, wherein identifying the geometric feature includes statistically analyzing the pressure responses to identify the shape of the bend.

18. The method of claim 11, further comprising inducing at least two positive pressure waves in the conduit.

19. The method of claim 11, further comprising inducing at least two negative pressure waves in the conduit.

20. The method of claim 11, wherein measuring the pressure responses in the conduit includes measuring pressure responses induced by a pump or a valve.

* * * * *